(12) United States Patent
Rapaport

(10) Patent No.: US 10,789,718 B1
(45) Date of Patent: *Sep. 29, 2020

(54) LOCAL MAXIMA SUB-INTEGER POSITION ESTIMATION IN VIDEO PROCESSING

(71) Applicant: Ambarella International LP, Santa Clara, CA (US)

(72) Inventor: Guy Rapaport, Sunnyvale, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,517

(22) Filed: Feb. 26, 2019

Related U.S. Application Data

(63) Continuation of application No. 15/581,220, filed on Apr. 28, 2017, now Pat. No. 10,249,049.

(51) Int. Cl.
  *G06T 7/277* (2017.01)
  *G06T 7/70* (2017.01)
  *G06T 7/246* (2017.01)
  *H04N 5/14* (2006.01)

(52) U.S. Cl.
  CPC ............. *G06T 7/277* (2017.01); *G06T 7/246* (2017.01); *G06T 7/70* (2017.01); *H04N 5/145* (2013.01)

(58) Field of Classification Search
  None
  See application file for complete search history.

(56) References Cited

U.S. PATENT DOCUMENTS

| | | | |
|---|---|---|---|
| 6,266,053 B1 | 7/2001 | French | 345/440 |
| 6,408,109 B1 | 6/2002 | Silver | 382/190 |
| 9,654,546 B1 | 5/2017 | Narsude | |
| 10,366,301 B1 * | 7/2019 | Linzer | G06K 9/00973 |
| 2002/0057839 A1 * | 5/2002 | Rinn | G06K 9/4609 |
| | | | 382/199 |
| 2003/0002713 A1 * | 1/2003 | Chen | G01S 13/931 |
| | | | 382/104 |
| 2007/0185950 A1 | 8/2007 | Yoshino | 708/492 |
| 2009/0257500 A1 * | 10/2009 | Karczewicz | H04N 19/176 |
| | | | 375/240.16 |
| 2010/0183195 A1 * | 7/2010 | Sharma | G06K 9/00771 |
| | | | 382/103 |
| 2018/0158227 A1 | 6/2018 | Reshetov | |

OTHER PUBLICATIONS

Sinha, S.N., Frahm, J., Pollefeys, M. et al. Feature tracking and matching in video using programmable graphics hardware. Machine Vision and Applications 22, 207-217 (2011). https://doi.org/10.1007/s00138-007-0105-z (Year: 2011).*

* cited by examiner

*Primary Examiner* — Rebecca A Volentine
(74) *Attorney, Agent, or Firm* — Christopher P. Maiorana, PC

(57) ABSTRACT

An apparatus include a first circuit and a second circuit. The first circuit may be configured to (i) receive a plurality of sample values from a plurality of images in a video signal and (ii) estimate a plurality of positions of a plurality of maximum values in the images. Each estimation may operate on the sample values in a respective local region oriented parallel to an axis. The second circuit may be configured to track the positions of the maximum values in the images.

20 Claims, 10 Drawing Sheets

LOCAL MAXIMA SUB-INTEGER POSITION ESTIMATION IN VIDEO PROCESSING

This application relates to U.S. Ser. No. 15/581,220, filed Apr. 28, 2017, which is incorporated by reference in its entirety.

FIELD OF THE INVENTION

The invention relates to position estimation generally and, more particularly, to a method and/or apparatus for implementing local maxima sub-integer position estimation in video processing.

BACKGROUND

In conventional computer vision frameworks, an initial stage usually consists of low level feature/object detection. An aim of the feature/object detection is to identify specific positions in the image that represent interesting locations or objects. The detection usually calculates a score for each pixel in a region of interest and a non-maximal suppression mechanism is applied in order to identify local maxima scores. The pixel positions of the local maxima scores are referred to as detections in that specific area. However, the detections are commonly at integer pixel locations that might not have sufficient accuracy for subsequent processing.

It would be desirable to implement local maxima sub-integer position estimation in video processing.

SUMMARY

The invention concerns an apparatus including a first circuit and a second circuit. The first circuit may be configured to (i) receive a plurality of sample values from a plurality of images in a video signal and (ii) estimate a plurality of positions of a plurality of maximum values in the images. Each estimation may operate on the sample values in a respective local region oriented parallel to an axis. The second circuit may be configured to track the positions of the maximum values in the images.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing local maxima sub-integer position estimation in video processing that may (i) have a sub-integer resolution, (ii) be implemented with simple hardware circuitry, (iii) operate over a small span of optimum candidate positions, (iv) use fractional bit results, (v) be implemented solely in hardware and/or (vi) be implemented as one or more integrated circuits.

Some computer vision applications (e.g., visual odometry, target tracking, motion estimation and other general post-detection techniques), may specify a sub-integer (or sub-pixel) resolution for identifying local maxima score positions and/or local minimum score positions in each image (e.g., picture, field or frame) of a video signal. In some embodiments, the local maxima/minimum score positions may be determined for still images and/or multidimensional score maps. The local maxima score positions may be determined by applying a non-maximum suppression technique to the video images. The local minimum score positions may be determined by applying a non-minimum suppression technique to the video images and subsequently inverting the images. An interpolation method may be applied on the scores in an immediate vicinity (or local region) of an integer-pixel maximum/minimum position detection. For two-dimensional images, each dimension may be considered independently. A second-order polynomial interpolation may be incorporated in each dimension in order to fine-tune the maximum position. In various embodiments, the interpolation may utilize several (e.g., three) score values in a vicinity of the detection along a particular axis (e.g., an X axis or a Y axis). The score values may be denoted as $S(1)$, $S(0)$, $S(-1)$, and so on, where index 0 marks a local maximum detection location with integer-pixel accuracy. The interpolation may find an optimal value (e.g., $X_{OPT}$ or $Y_{OPT}$) that may correspond to the maximal value of the parabola at a sub-pixel resolution. An interpolation along the X axis may be expressed by formula 1 as follows:

$$X_{OPT} = -\frac{S(1) - S(-1)}{2(S(1) - 2S(0) + S(-1))} \quad (1)$$

A similar formula may be applicable for the Y axis. The value $X_{OPT}$ is usually quantized by selecting a number (e.g., k) of fractional bits according to a specified sub-pixel accuracy of a designated application. The fractional bits k generally establish a resolution of the value $X_{OPT}$. For example, a 2-bit fraction (e.g., k=2) may provide a quarter-pixel (or quarter-integer) resolution of the value $X_{OPT}$. Other fractions and resolutions may be implemented to meet the design criteria of a particular application.

Figure 1:
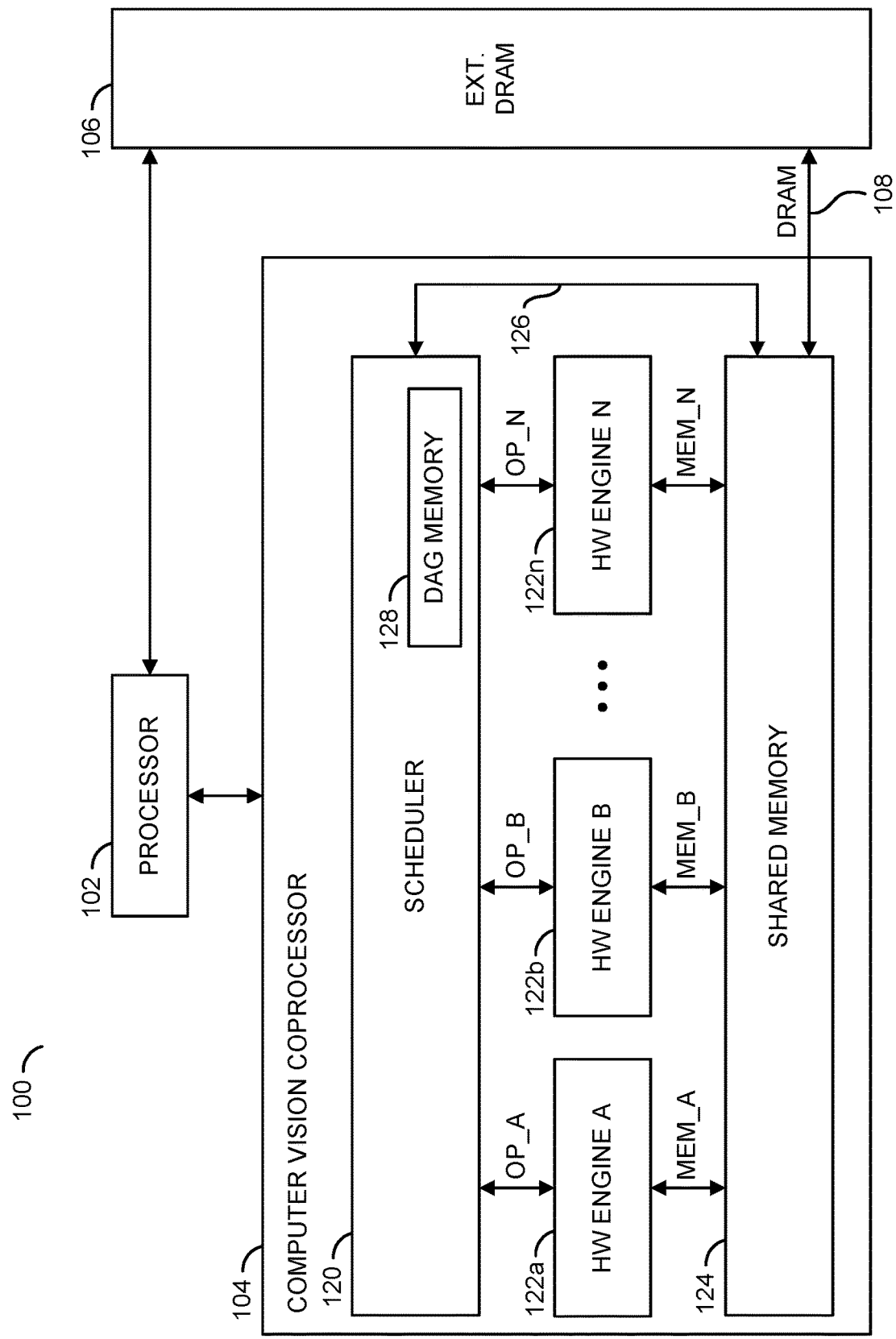
FIG. 1 is a diagram of a system.

Referring to FIG. 1, a diagram of a system 100 is shown illustrating a context in which a local maxima sub-integer position estimation approach in accordance with an example embodiment of the invention may be implemented. The system (or apparatus) 100 may be implemented as part of a computer vision system. In various embodiments, the system 100 may be implemented as part of a camera, a computer, a server (e.g., a cloud server), a smart phone (e.g., a cellular telephone), a personal digital assistant, or the like.

In an example embodiment, the system 100 generally comprises a block (or circuit) 102, a block (or circuit) 104, a block (or circuit) 106 and a memory bus 108. The circuit 104 generally comprises a block (or circuit) 120, one or more blocks (or circuits) 122a-122n, a block (or circuit) 124 and a path 126. The circuit 120 may include a block (or circuit) 128.

Multiple signals (e.g., OP_A to OP_N) may be exchanged between the circuit 120 and the respective circuits 122a-122n. Each signal OP_A to OP_N may convey execution operation information and/or yield operation information. Multiple signals (e.g., MEM_A to MEM_N) may be exchanged between the respective circuits 122a-122n and the circuit 124. The signals MEM_A to MEM_N may carry data. A signal (e.g., DRAM) may be exchanged between the circuit 106 and the circuit 124. The signal DRAM may transfer data between the circuits 106 and 124.

The circuit 102 may implement a processor circuit. In some embodiments, the processor circuit 102 may be a general purpose processor circuit. The processor circuit 102 may be operational to interact with the circuit 104 and the circuit 106 to perform various processing tasks.

The circuit 104 may implement a coprocessor circuit. The coprocessor circuit 104 is generally operational to perform specific processing tasks as arranged by the processor circuit 102. The coprocessor circuit 104 may be separate from the processor circuit 102 and generally helps the primary processor circuit 102 to accomplish the processing tasks. In various embodiments, the coprocessor 104 may be implemented solely in hardware. The coprocessor 104 may directly perform a data flow directed acyclic graph generated by software that specifies processing (e.g., computer vision) tasks. The directed acyclic graph generally contains descriptors that specify input/output buffers in the circuit 106 and/or the circuit 124, computation nodes that perform processing computations, called operators, and the dependencies between data buffers and operators (e.g., links in the graphs).

The circuit 106 may implement a dynamic random access memory (DRAM) circuit. The DRAM circuit 106 is generally operational to store multidimensional arrays of input data elements and various forms of output data elements. The DRAM circuit 106 may exchange the input data elements and the output data elements with the processor circuit 102 and the coprocessor circuit 104.

The circuit 120 may implement a scheduler circuit. The scheduler circuit 120 is generally operational to schedule tasks among the circuits 122a-122n to perform a variety of computer vision tasks as defined by the processor circuit 102. Individual tasks may be allocated by the scheduler circuit 120 to the circuits 122a-122n. The scheduler circuit 120 may time multiplex the tasks to the circuits 122a-122n based on the availability of the circuits 122a-122n to perform the work.

Each circuit 122a-122n may implement a processing resource (or hardware engine). The hardware engines 122a-122n are generally operational to perform specific processing tasks. In some configurations, the hardware engines 122a-122n may operate in parallel and independent of each other. In other configurations, the hardware engines 122a-122n may operate collectively among each other to perform allocated tasks. The hardware engines 122a-122n may be homogenous processing resources (e.g., all circuits 122a-122n may have the same capabilities) or heterogeneous processing resources (e.g., two or more circuits 122a-122n may have different capabilities). The operators performed by the hardware engines 122a-122n may include, but are not limited to, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a local maxima sub-integer position estimation operator. In various embodiments, the hardware engines 122a-122n may be implemented solely as hardware circuits.

The circuit 124 may implement a shared memory circuit. The shared memory 124 is generally operational to store all of or portions of the multidimensional arrays (or vectors) of input data elements and output data elements generated by the hardware engines 122a-122n. The input data elements may be received from the DRAM circuit 106 via the memory bus 108. The output data elements may be sent to the DRAM circuit 106 via the memory bus 108.

The path 126 may implement a transfer path internal to the coprocessor 104. The transfer path 126 is generally operational to move data from the scheduler circuit 120 to the shared memory 124. The transfer path 126 may also be operational to move data from the shared memory 124 to the scheduler circuit 120.

The circuit 128 may implement a local DAG memory. The DAG memory 128 may be operational to store one or more binary representations of one or more directed acyclic graphs used by the scheduler circuit 120. The directed acyclic graph representations may be compiled external to the system 100 and loaded into the DAG memory 128 through the shared memory 124.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands. In some embodiments, multiple (e.g., two) separate tables may be employed, a table of all operators and another table of all descriptors linked together with explicit registers.

The directed acyclic graph processing performed by the coprocessor 104 generally supports the general-purpose host processing in the processor 102 where the processor 102 may execute traditional reduced instruction set computing (RISC)-based instructions. Software running on the processor 102 may be the controlling task. Prior to run time, a directed acyclic graph compiler may prepare one or more binary representations of one or more directed acyclic graphs composed of operators, the location of primary input/output data structures in DRAM circuit 106, and the links between operators through the shared memory 124. The directed acyclic graph binary representations may be loaded into the DAG memory 128.

As the processor 102 executes a coprocessor instruction, the instruction may be placed into a queue of the coprocessor 104. Software running on the processor 102 may command performance of the directed acyclic graph in the coprocessor 104 by executing a "run" coprocessor instruction. The coprocessor 104 may respond to the coprocessor instructions from the queues, one at a time. Upon completion of the directed acyclic graph, the coprocessor 104 may store the results in the DRAM circuit 106 and signal the processor 102 that the coprocessor instruction is finished.

In various embodiments, one or more of the hardware engines 122a-122n may be implemented with simple operators (e.g., addition, subtraction, comparison and absolute value). One or more of the hardware engines 122a-122n may be scheduled to processes multiple sampling positions for a non-maximum/non-minimum suppression process and an interpolation process. By way of example, the interpolation processing may concentrate on a case of sub-pixel accuracy with two fraction bits. As such, the possible values of the positions $X_{OPT}$ generally have a quarter pixel gap between each other. Other numbers of fractional bits and resolutions may be implemented to meet the design criteria of a particular application. Additional details for the architecture of the system 100 and for the non-maximum suppression processing may be found in co-pending U.S. application Ser. No. 15/459,284, filed Mar. 15, 2017, and Ser. No. 15/291,273, filed Oct. 12, 2016, each of which are hereby incorporated by reference in their entirety.

Figure 2:
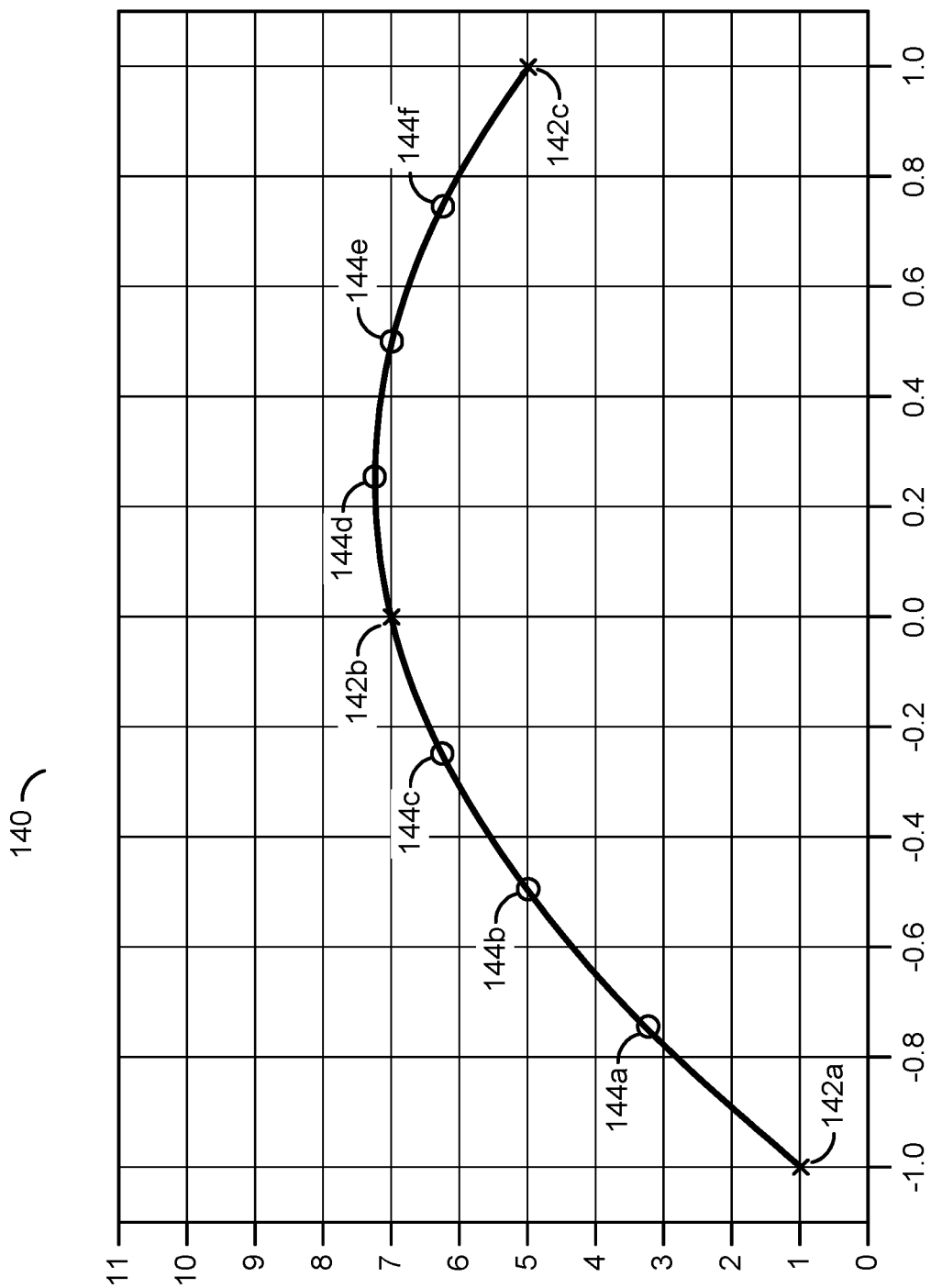
FIG. 2 is a graph of a curve around a local maximum.

Referring to FIG. 2, a graph 140 of an example parabolic curve around a local maximum is shown. The graph 140 generally illustrates multiple measured sample values 142a-142c and multiple estimated sub-pixel (or sub-integer) sample values 144a-144f in a local region. The integer sample values 142a-142c and the sub-integer sample values 144a-144f may be aligned along the X axis of the graph 140. A center integer-position maximum sample value 142b (e.g., S(0)) is generally normalized to a zero position on the horizontal axis. The bracketing measured samples 142a (e.g., S(−1)) and 142c (e.g., S(1)) may be located at a −1 position and a +1 position, respectively. The sub-integer sample values 144a-144c may be located at the quarter positions between −1 and 0, noninclusive. The sub-integer sample values 144d-144f may be located at the quarter position between 0 and +1, noninclusive. An amplitude of the samples 142a-142c and 144a-144f may be expressed along the vertical axis. In the example, the actual maximum value on the parabolic curve is shown at the position 144d.

Since the sample S(0) (e.g., sample 142b) may be the local maximum location among the integer-pixel samples (e.g., samples 142a-142c), a difference value (e.g., $\Delta_{+1}$) between the samples S(0) and S(1) (e.g., sample 142c) may be expressed by formula 2 as follows:

$$\Delta_{+1} = S(0) - S(1) \quad (2)$$

Since the sample S(0) may be the local maximum, and so larger than or the same as the sample S(1) by definition, the value $\Delta_{+1}$ may be zero or greater. Likewise, a difference value (e.g., $\Delta_{-1}$) between the samples S(0) and S(−1) (e.g., sample 142a) may be expressed by formula 3 as follows:

$$\Delta_{-1} = S(0) - S(-1) \quad (3)$$

Since the sample S(0) may be the local maximum, and so larger than or the same as the sample S(−1) by definition, the value $\Delta_{-1}$ may also be zero or greater. Using a fixed point representation (e.g., with 2 fraction bits), an index representation (e.g., I) of the nine possible positions (e.g., 142a-142c and 144a-144f) may be expressed by formula 4 as follows:

$$I = 4 \cdot X \quad (4)$$

where X may range from −1 to +1. For simplicity, the range of X may be reduced to −½ to +½ because $X_{OPT}$ may exist only in a range [−½, +½], as derived from formula 1. An optimal representation (e.g., $I_{OPT}$) of the possible positions may be expressed by formula 5 as follows:

$$I_{OPT} = 4 \cdot X_{opt} \quad (5)$$

The maximum estimation may be determined by calculating a cost function (e.g., $T_I$) for each possible sub-integer position over the range of X from −½ to +½. The cost function $T_I$ may be expressed by formula 6 as follows:

$$T_I = |I \cdot (\Delta_{+1} + \Delta_{-1}) + 2 \cdot (\Delta_{+1} - \Delta_{-1})| \quad (6)$$

where I may be [−2, −1, 0, 1, 2]. The representation $I_{OPT}$ may be calculated as the minimum cost function per formula 7 as follows:

$$I_{OPT} = \mathrm{ArgMin}_I \{T_I\} \quad (7)$$

where the function $\mathrm{ArgMin}_I$ generally returns a position at which $T_I$ is minimized.

The cost function $T_I$ may be determined by substituting $\Delta_{+1}$ from formula 2 and $\Delta_{-1}$ from formula 3 into formula 1. The cost optimum position $X_{OPT}$ may be calculated by formula 8 as follows:

$$(X_{OPT} \cdot 2 \cdot (\Delta_{+1} - \Delta_{-1})) + (\Delta_{+1} - \Delta_{-1}) = 0 \quad (8)$$

The cost function $T_I$ may be expressed by formula 9 as follows:

$$T_I = (X \cdot 2 \cdot (\Delta_{+1} + \Delta_{-1})) + (\Delta_{+1} - \Delta_{-1}) | \approx |I \cdot (\Delta_{+1} + \Delta_{-1}) + 2 \cdot (\Delta_{+1} - \Delta_{-1})| \quad (9)$$

Therefore, the representation $I_{POT}$ and the cost $T_I$ may be determined from formulae 7 and 9.

A hardware embodiment that determines the cost $T_I$ may avoid multiplications and divisions with the following changes. The multiply by 2 may be implemented as a left-shift operation on a binary value. Since the values I are consecutive, the multiplication $[I \cdot (\Delta_{+1} + \Delta_{-1})]$ may be calculated by adding the value of $(\Delta_{+1} + \Delta_{-1})$ in each iteration, one iteration starting from zero and running to 2, another iteration starting from 0 and running to −2.

Instead of considering five possible positions over the range of −½ to +½ to find the maximum value $X_{OPT}$, fewer (e.g., three) positions may be checked upon determining that the maximum value $X_{OPT}$ is to the left, to the right, or at the center integer-position sample S(0). Since a sign function (e.g., SIGN) of a difference between the two delta values $\Delta_{+1}$ and $\Delta_{-1}$ may be −1, 0 or +1, the cost function formula (9) may be rewritten as formula 10 as follows:

$$T_I = |(\mathrm{SIGN}(\Delta_{-1} - \Delta_{+1}) \cdot I \cdot (\Delta_{+1} + \Delta_{-1})) + 2 \cdot (\Delta_{+1} - \Delta_{-1})| \quad (10)$$

Substituting formula 10 into formula 7 generally results in formula 11 as follows:

$$I_{OPT} = \mathrm{SIGN}(\Delta_{-1} - \Delta_{+1}) \cdot \mathrm{ArgMin}_I \{T_I\} \quad (11)$$

Figure 3:
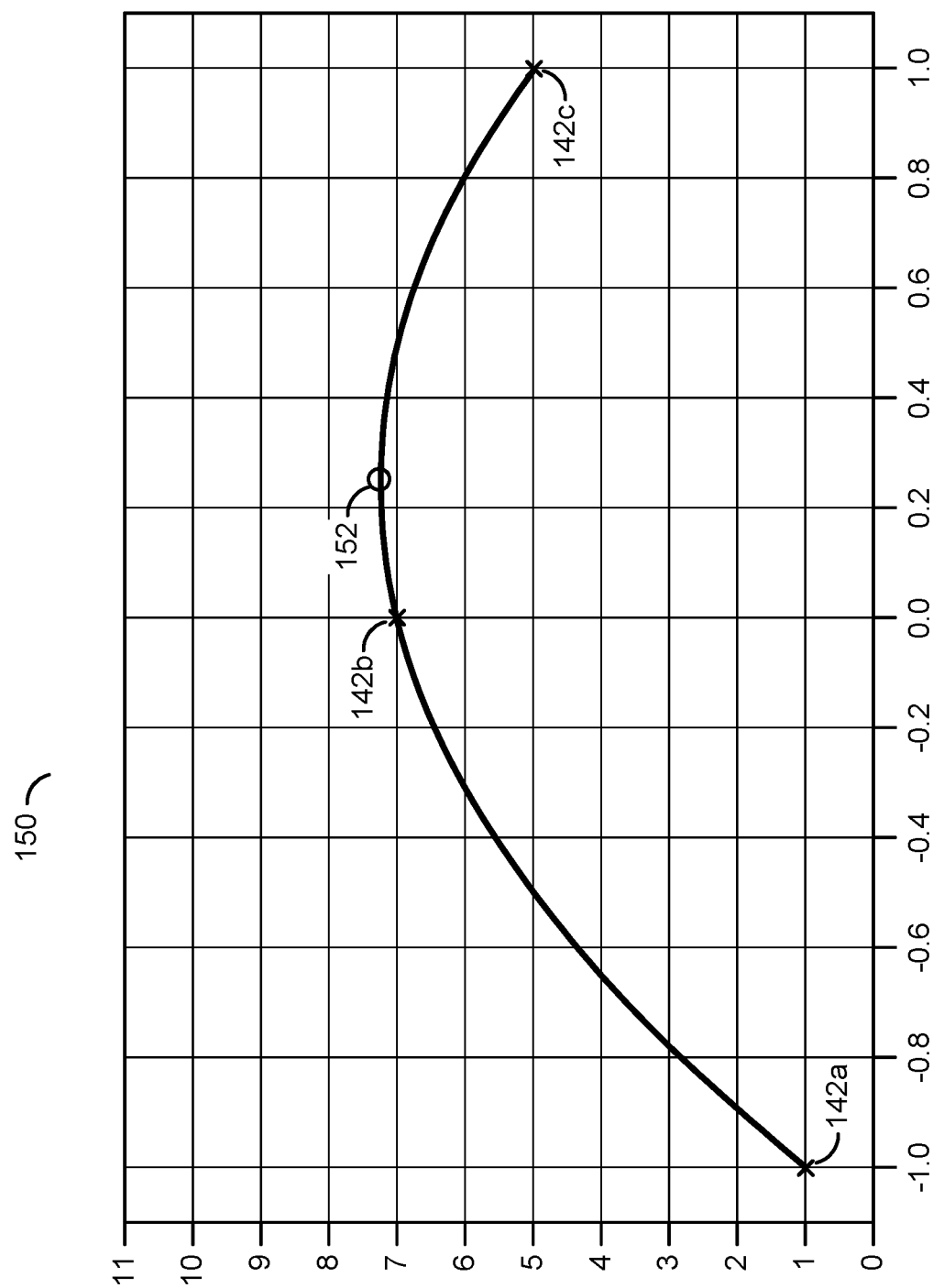
FIG. 3 is a graph of a parabolic curve.

Referring to FIG. 3, a graph 150 of an example parabolic curve in local region around a local maximum is shown. In the example, the actual local maximum position 152 may be right of the center integer-position maximum position 142b. A relationship between the delta value $\Delta_{+1}$ and the delta value $\Delta_{-1}$ may be used to reduce the search range. As illustrated, $\Delta_{-1} \geq \Delta_{+1}$ (e.g., the separation between 142a and 142b is greater than the difference from 142b to 142c) so the search range may be reduced to [0, +½] (e.g., between 142b and 142c).

Figure 4:
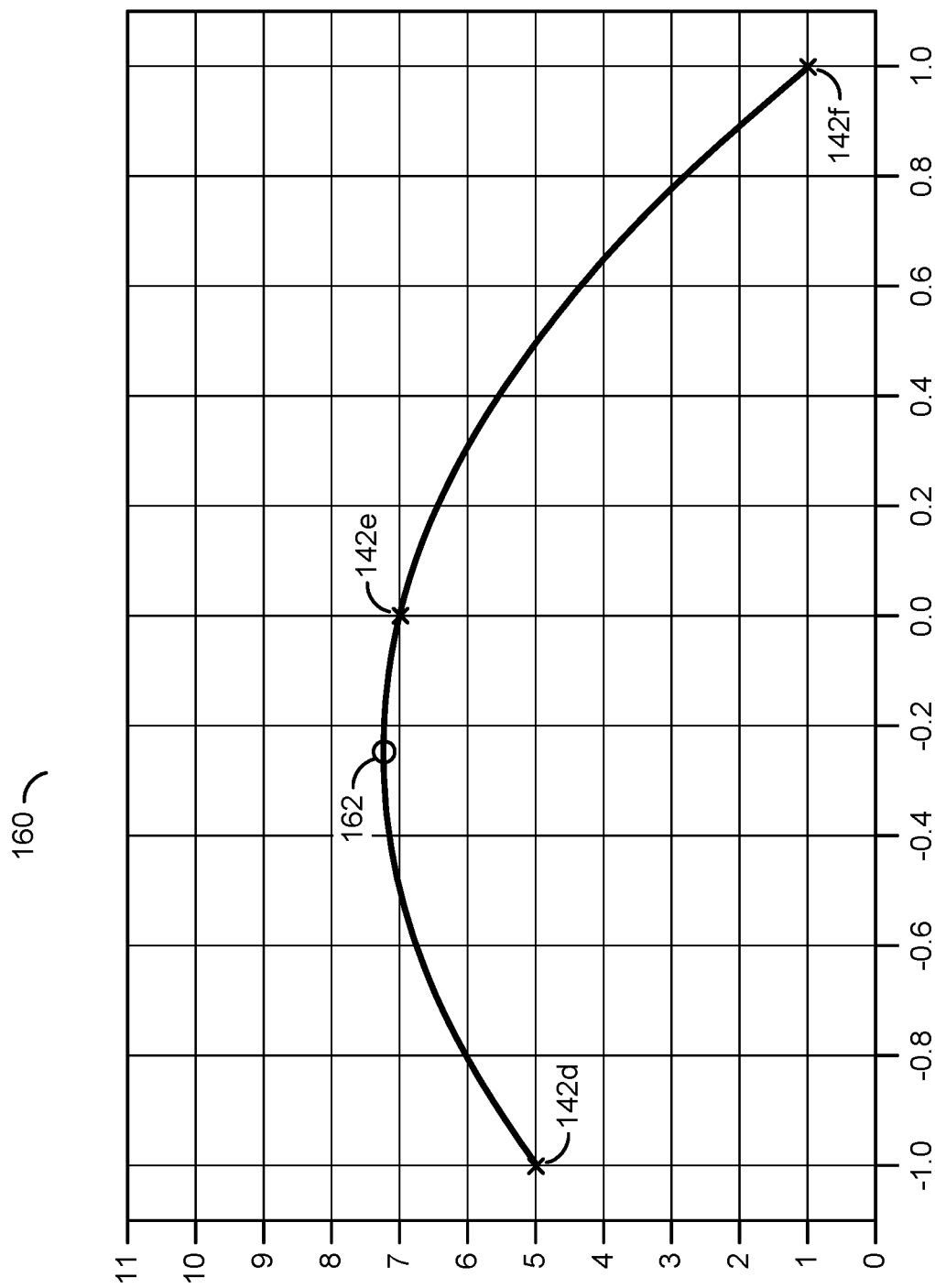
FIG. 4 is a graph of another parabolic curve.

Referring to FIG. 4, a graph 160 of an example parabolic curve in a local region around another local maximum is shown. In the example, the actual local maximum position 162 may be left of the center integer-position maximum position 142e. The relationship between the delta value $\Delta_{+1}$ and the delta value $\Delta_{-1}$ may be used to reduce the search range. As illustrated, $\Delta_{-1} \leq \Delta_{+1}$ (e.g., the separation between 142d and 142e is less than the difference from 142d to 142f) so the search range may be reduced to [−½, 0] (e.g., between 142d and 142e).

As a result, depending on $\mathrm{SIGN}(\Delta_{-1} - \Delta_{+1})$, a check may be performed on only positive options or negative options to find $I_{OPT}$. The formula 11 may thus be similar to the formula 7. By using $\mathrm{SIGN}(\Delta_{-1} - \Delta_{+1})$, the search technique may work either with I=[0,1,2] or with I=[−2,−1,0]. The multiply by 2 in formula 11 may be implemented as a left-shift operation on a binary value. Since the values I are consecutive, the multiplication [I·($\Delta_{+1}+\Delta_{-1}$)] may be calculated by adding (or subtracting) the value of ($\Delta_{+1}+\Delta_{-1}$) in each iteration.

Figure 5:
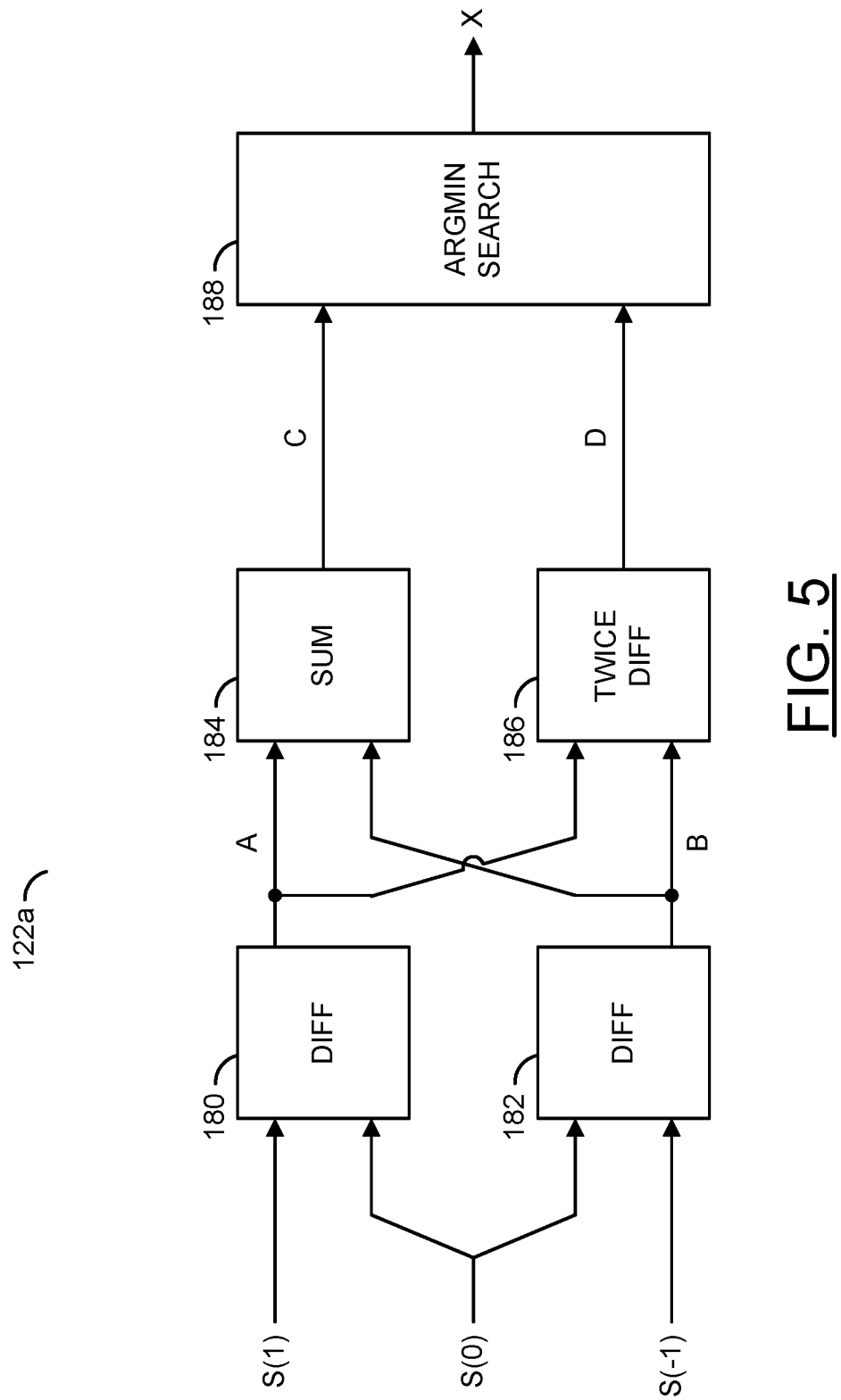
FIG. 5 is a diagram of a hardware engine.

Referring to FIG. 5, a block diagram of an example implementation of a hardware engine 122a is shown. The hardware engine 122a may be operational to generate a sub-pixel resolution maximum estimation from multiple (e.g., three) samples. The hardware engine 122a generally comprises a block (or circuit) 180, a block (or circuit) 182, a block (or circuit) 184, a block (or circuit) 186 and a block (or circuit) 188. In some embodiments, the circuits 180 to 188 may be implemented solely in hardware. A signal (e.g., S(1)) may be received by the circuit 180.

The signal S(1) may convey a value of the sample S(1). A signal (e.g., S(0)) may be received by the circuit 180 and the circuit 182. The signal S(0) may carry a value of the sample S(0). A signal (e.g., S(−1)) may be received by the circuit 182. The signal S(−1) may carry a value of the sample S(−1). The circuit 188 may generate a signal (e.g., X). The signal X may carry the location of the local maximum value (e.g., $X_{OPT}$).

The circuit 180 may generate a signal (e.g., A) received by the circuit 184 and the circuit 186. The signal A may convey a value of the difference between the sample values S(0) and S(1) (e.g., $\Delta_1$). The circuit 182 may generate a signal (e.g., B) received by the circuit 184 and the circuit 186. The signal B may convey a value of the difference between the sample values S(0) and S(−1) (e.g., $\Delta_{-1}$). A signal (e.g., C) may be generated by the circuit 184 and received by the circuit 188. The signal C may carry a sum of the values in the signal A and the signal B (e.g., $\Delta_{+1}+\Delta_{-1}$). In some embodiments, a signal (e.g., D) may be generated by the circuit 186 and received by the circuit 188. The signal D may transfer twice a difference between the value in the signal A minus the value in the signal B (e.g., 2($\Delta_{+1}-\Delta_{-1}$)). The circuit 188 may generate the signal X. The circuit 188 may implement a maximum circuit configured to determine the value $X_{OPT}$ in the signal X.

The hardware engine 122a may be operational to generate an estimation of the location $X_{OPT}$ from the sample values S(−1), S(0) and S(1) based on a parabolic curve aligned with an axis of an image. For example, the hardware engine 122a may estimate a parabolic curve based on the plurality of samples along an X axis in each of a plurality of images of a video. The hardware engine 122a may also generate a position $X_{OPT}$ of the maximum value on the X axis in the parabolic curves based on the samples in each of the images. The processor 102 may use the positions $X_{OPT}$ to determine X-axis motion in the video. In various embodiments, the values processed by the hardware engine 122a may be expressed as two's-complement binary number to allow for both positive values and negative values.

In some embodiments, the hardware engine 122a may operate on each image in the video in a time multiplexed manner to determine the positions (e.g., $Y_{OPT}$) of the maximum values along a Y axis in the images. In other embodiments, another hardware engine (e.g., 122b) may operate on each image in the video in parallel to the hardware engine 122a. The hardware engine 122b may have the same design as the hardware engine 122a. The hardware engine 122b may determine the positions $Y_{OPT}$ of the maximum values along the Y axis. The processor 102 may use the positions $Y_{OPT}$ to determine Y-axis motion in the video. A combination of the X-axis motion and the Y-axis motion may provide an estimation of two-dimensional motion in the video. In various embodiments, the motion estimation may track interesting locations and/or objects (e.g., corners, pedestrians, vehicles, and the like). The processor 102 and/or hardware engines 122a-122n may be configured to provide additional processing on the positions $X_{OPT}$ and $Y_{OPT}$ to meet the design criteria of a particular application. The additional processing may include, but is not limited to, visual odometry, target tracking, object position detection, feature position detection, object motion estimation and feature motion detection.

Figure 6:
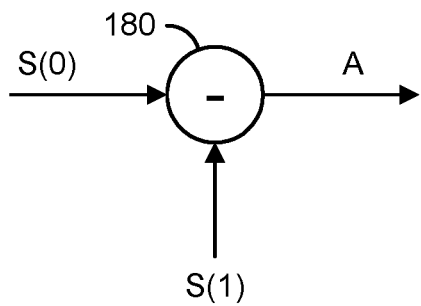
FIG. 6 is a diagram of a subtraction circuit.

Referring to FIG. 6, a block diagram of an example implementation of the circuit 180 is shown. The circuit 180 may be implemented as a subtraction circuit. The subtraction circuit 180 is generally operational to generate the difference value $\Delta_{+1}$ in the signal A by subtracting the sample value S(1) from the sample value S(0) per formula 2.

Figure 7:
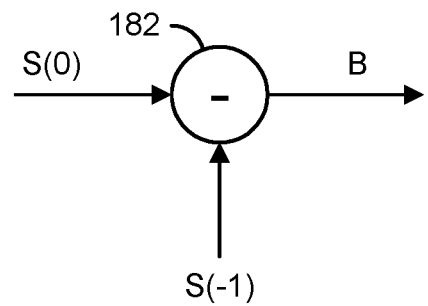
FIG. 7 is a diagram of another subtraction circuit.

Referring to FIG. 7, a block diagram of an example implementation of the circuit 182 is shown. The circuit 182 may be implemented as another subtraction circuit. The subtraction circuit 182 is generally operational to generate the difference value $\Delta_{-1}$ in the signal B by subtracting the sample value S(−1) from the sample value S(0) per formula 3.

Figure 8:
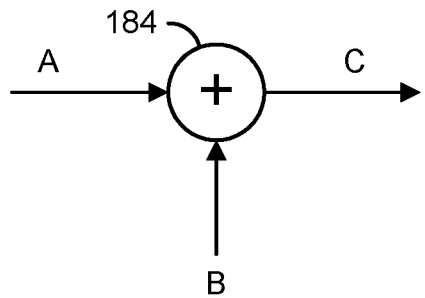
FIG. 8 is a diagram of an addition circuit.

Referring to FIG. 8, a block diagram of an example implementation of the circuit 184 is shown. The circuit 184 may be implemented as an addition circuit. The addition circuit 184 is generally operational to generate the sum value $\Delta_{+1}+\Delta_{-1}$ in the signal C by adding the value $\Delta_{+1}$ in the signal A to the value $\Delta_{-1}$ in the signal B.

Figure 9:
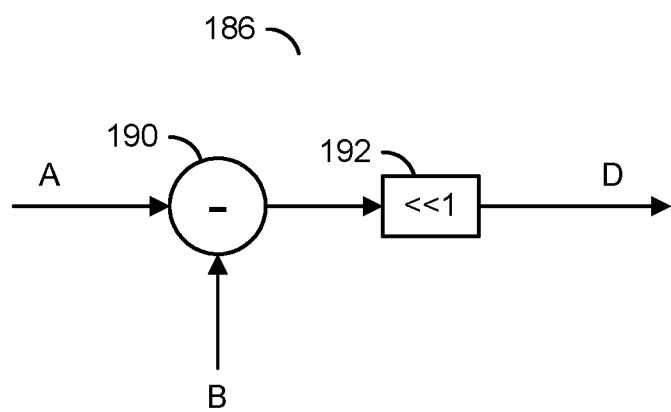
FIG. 9 is a diagram of a subtraction/shift circuit.

Referring to FIG. 9, a block diagram of an example implementation of the circuit 186 is shown. The circuit 186 generally comprises a block (or circuit) 190 and a block (or circuit) 192. The circuit 190 may implement a subtraction circuit. The subtraction circuit 190 may be operational to generate the value $\Delta_{+1}-\Delta_{-1}$ by subtracting the value $\Delta_{-1}$ from the value $\Delta_{+1}$. The circuit 192 may implement a shift circuit. The shift circuit 192 may be operational to left-shift the binary value $\Delta_{+1}-\Delta_{-1}$ to generate the value 2($\Delta_{+1}-\Delta_{-1}$) in the signal D.

Figure 10:
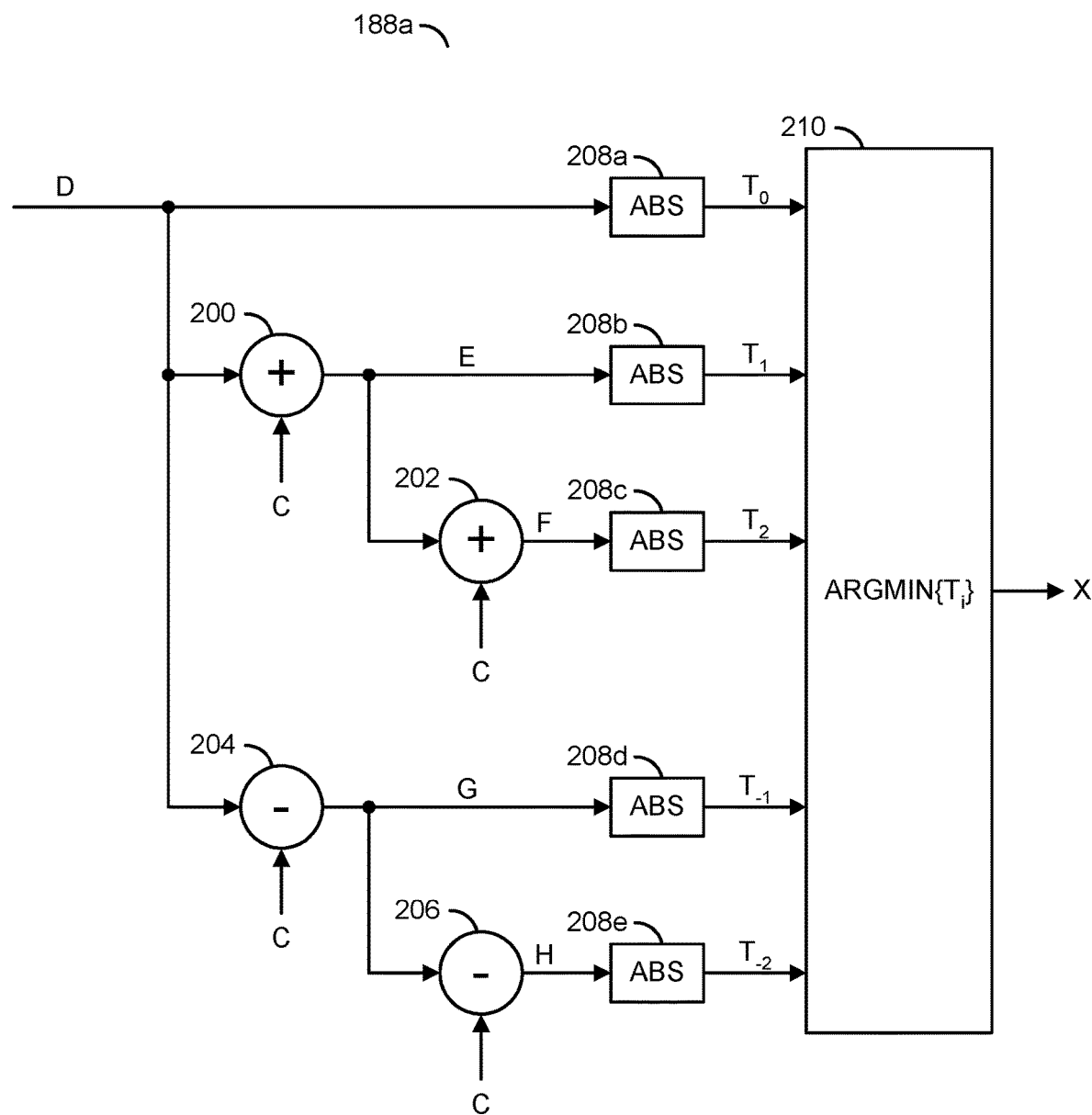
FIG. 10 is a diagram of a maximum circuit.

Referring to FIG. 10, a block diagram of an example implementation of a circuit 188a is shown. The circuit 188a may represent the maximum circuit 188 in various embodiments of the hardware circuit 122a. The maximum circuit 188a may be operational to generate the position $X_{OPT}$ based on the signals D and C. The maximum circuit 188a generally comprises a block (or circuit) 200, a block (or circuit) 202, a block (or circuit) 204, a block (or circuit) 206, multiple blocks (or circuits) 208a-208e and a block (or circuit) 210. In some embodiments, the circuits 200-210 may be implemented solely in hardware.

The signal C may be received by the circuits 200, 202, 204 and 206. The signal D may be received by the circuits 200, 204 and 208a. The signal X may be generated by the circuit 210. The circuit 200 may generate a signal (e.g., E) received by the circuits 202 and 208b. The signal E may carry a sum value (e.g., $3\Delta_{+1}-\Delta_{-1}$). The circuit 202 may generate a signal (e.g., F) received by the circuit 208c. The signal F may convey a sum value (e.g., $4\Delta_{+1}$). A signal (e.g., G) may be generated by the circuit 204 and received by the circuits 206 and 208d. The signal G may carry a difference value (e.g., $\Delta_{+1}-3\Delta_{-1}$). The circuit 206 may generate a signal (e.g., H) received by the circuit 208e. The signal H may convey a difference value (e.g., $-4\Delta_{-1}$). The circuits 208a-208f may generate signals (e.g., $T_0$, $T_1$, $T_2$, $T_{-1}$ and $T_{-2}$, respectively) received by the circuit 210. The signals $T_0$, $T_1$, $T_2$, $T_{-1}$ and $T_{-2}$ may carry absolute values of the values received in the signals D, E, F, G and H, respectively.

The circuit 200 may implement an adder circuit. The adder circuit 200 is generally operational to add the values in the signals C and D to generate the signal E. The signal E may be presented to the circuits 202 and 208b.

The circuit 202 may implement another adder circuit. The adder circuit 202 is generally operational to add the values in the signals C and E to generate the signal F. The signal F may be received by the circuit 208c.

The circuit 204 may implement a subtraction circuit. The subtraction circuit 204 is generally operational to subtract the value in the signal C from the value in the signal D to generate the signal G. The signal G may be presented to the circuits 206 and 208d.

The circuit 206 may implement another subtraction circuit. The subtraction circuit 206 is generally operational to subtract the value in the signal C from the value in the signal G to generate the signal H. The signal H may be received by the circuit 208e.

Each circuit 208a-208f may implement an absolute value circuit. The absolute value circuits 208a-208f may each be operational to generate an absolute value (or cost value) from the values received in the signals D, E, F, G and H, respectively. The signals $T_0$, $T_1$, $T_2$, $T_{-1}$ and $T_{-2}$ may be transferred to the circuit 210.

The circuit 210 may implement a minimum argument circuit. The circuit 210 is generally operational to generate a value in the signal X that matches the minimal (or smallest) value among the multiple (e.g., five) cost values in the signals $T_0$, $T_1$, $T_2$, $T_{-1}$ and $T_{-2}$. In various embodiments, the minimum argument circuit 210 may be implemented solely in hardware.

Figure 11:
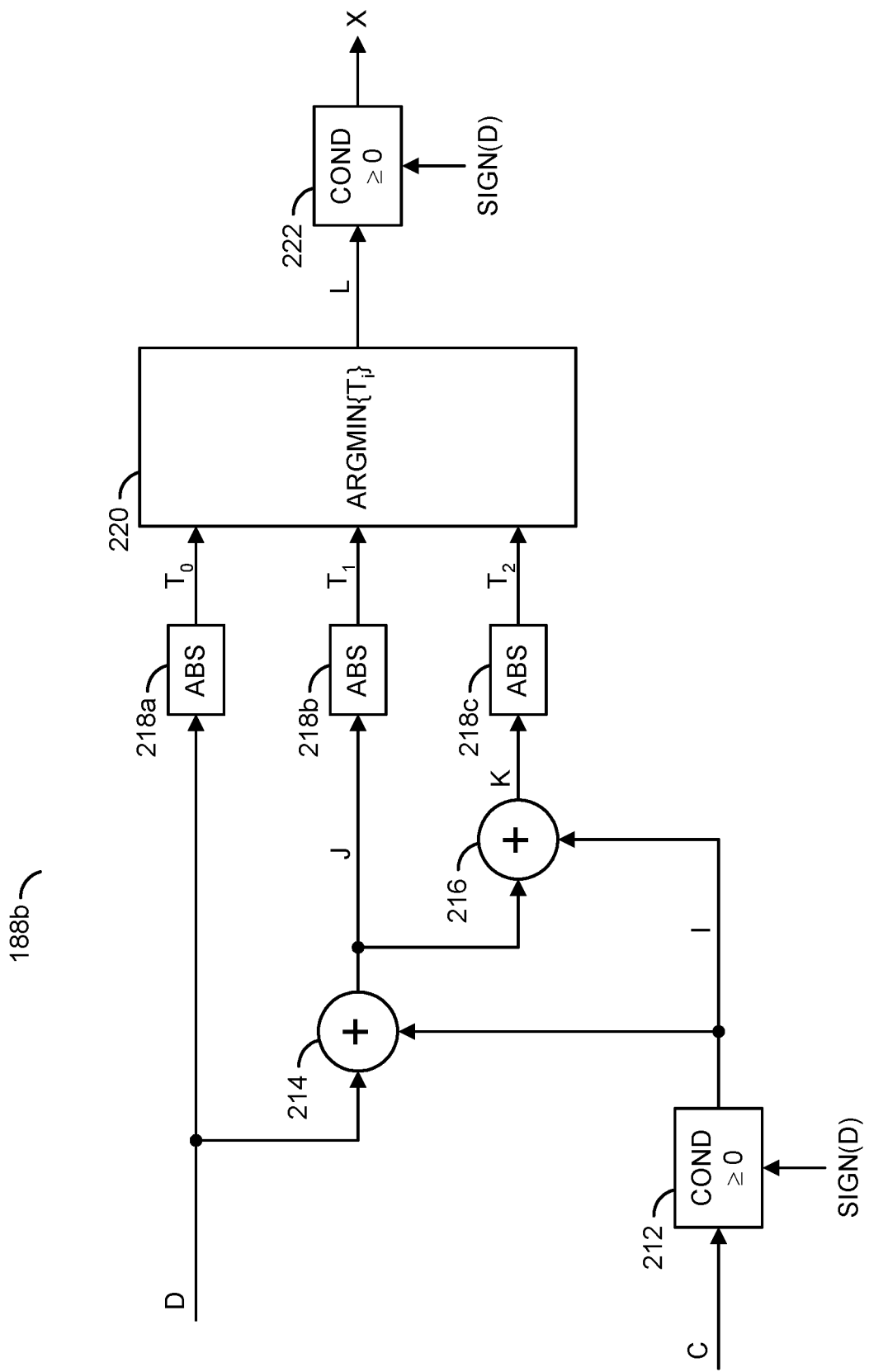
FIG. 11 is a diagram of another maximum circuit.

Referring to FIG. 11, a block diagram of an example implementation of a circuit 188b is shown. The circuit 188b may be a variation of the maximum circuit 188a. The circuit 188b generally represents the maximum circuit 188 in various embodiments of the hardware circuit 122a. The maximum circuit 188b may be operational to generate the position $X_{OPT}$ based on the signals D and C and a sign (e.g., positive or negative) of the value in the signal D. A value of zero may be treated as a positive value. The maximum circuit 188b generally comprises a block (or circuit) 212, a block (or circuit) 214, a block (or circuit) 216, multiple blocks (or circuits) 218a-228c, a block (or circuit) 220 and a block (or circuit) 222. In some embodiments, the circuits 212-222 may be implemented solely in hardware.

The signal D may be received by the circuits 214 and 218a. A signal (e.g., SIGN(D)) may be received by the circuits 212 and 222. The signal SIGN(D) may convey a sign of the value in the signal D. A value of zero may be treated as a positive value. The signal X may be generated by the circuit 222. The circuit 212 may generate a signal (e.g., I) received by the circuits 214 and 216. The signal I may carry either a value or an inverse of the value in the signal C. The circuit 214 may generate a signal (e.g., J) received by the circuits 216 and 218b. The signal J may convey a sum value. A signal (e.g., K) may be generated by the circuit 216 and received by the circuit 218c. The signal K may carry a sum value. The circuits 218a-218c may generate signals (e.g., $T_0$, $T_1$ and $T_2$, respectively) received by the circuit 220. The signals $T_0$, $T_1$ and $T_2$ may carry absolute values of the values received in the signals D, J and K, respectively. The circuit 220 may generate a signal (e.g., L). The signal L may carry a minimum argument value.

The circuit 212 may implement a condition circuit. The condition circuit 212 may be operational to generate the signal I with either the value in the signal C while the signal SIGN(D) has a positive value, or an inverse of the value in the signal C while the signal SIGN(D) has a negative value. The signal I may be received by the circuits 214 and 216.

The circuit 214 may implement an adder circuit. The adder circuit 214 is generally operational to add the values in the signals D and I to generate the signal J. The signal J may be received by the circuits 216 and 218b.

The circuit 216 may implement another adder circuit. The adder circuit 216 is generally operational to add the values in the signals I and J to generate the signal K. The signal K may be presented to the circuit 218c.

Each circuit 218a-218c may implement an absolute value circuit. The absolute value circuits 218a-218c may each be operational to generate an absolute value (or cost value) from the values received in the signals D, J and K, respectively. The signals $T_0$, $T_1$ and $T_2$ may be received by the circuit 220.

The circuit 220 may implement a minimum argument circuit. The circuit 220 is generally operational to generate a value in the signal L that matches the minimal (or smallest) value among the multiple (e.g., three) cost values in the signals $T_0$, $T_1$ and $T_2$. In various embodiments, the minimum argument circuit 220 may be implemented solely in hardware.

The circuit 222 may implement a condition circuit. The condition circuit 222 may be operational to generate the signal X with either the value in the signal L while the signal SIGN(D) has a positive value, or an inverse of the value in the signal L while the signal SIGN(D) has a negative value. In various embodiments, the circuit 222 may be implemented only in hardware.

Figure 12:
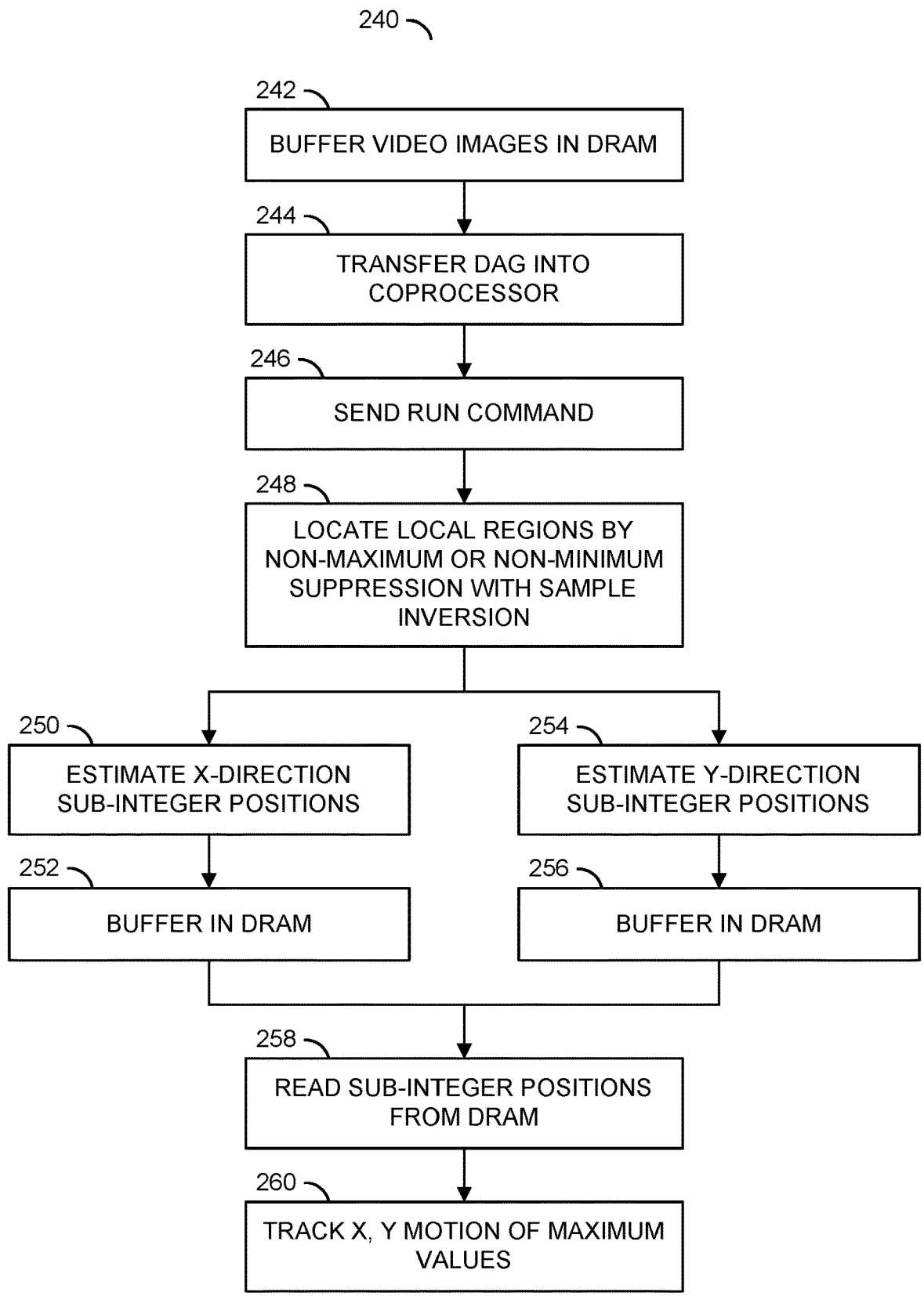
FIG. 12 is a flow diagram for local maximum sub-integer position tracking.

Referring to FIG. 12, a flow diagram of an example process 240 for local maximum sub-integer position tracking is shown. The process (or method) 240 may be implemented in the system 100. The process 240 generally comprises a step (or state) 242, a step (or state) 244, a step (or state) 246, a step (or state) 248, a step (or state) 250, a step (or state) 252, a step (or state) 254, a step (or state) 256, a step (or state) 258 and a step (or state) 260.

In the step 242, the images of a video signal may be streamed into and buffered in the DRAM circuit 106. The processor 102 may transfer one or more binary representations of directed acyclic graphs directed to non-maximum/non-minimum suppression and local maxima sub-integer estimation operations into the coprocessor 104 in the step 244. Once the binary representations of the directed acyclic graphs are loaded into the coprocessor 104, the processor 102 may issue a run command to the coprocessor 104 in the step 246.

In the step 248, one or more of the hardware engines 122a-122n in the coprocessor 104 may locate one or more local regions of interest by performing the non-maximum suppression operation and/or the non-minimum suppression operation. If the non-minimum suppression operation is performed, the coprocessor 104 may also invert the sample values in the images such that the small sample values in the local regions around the minimum values become large values.

One or more of the hardware engines 122a-122n may estimate sub-integer resolution positions along the X-axis of the maximum value within the local regions in the step 250. The X-positions of the maximum values may be stored in the DRAM circuit 106 in the step 250. One or more of the hardware engines 122a-122n may estimate sub-integer resolution positions along the Y-axis of the maximum value within the local regions in the step 254. The Y-positions of the maximum values may be stored in the DRAM circuit 106 in the step 256. The hardware engines 122a-122n may notify the processor 102 when the processing has completed.

In the step 258, the processor 102 may read the X-positions and the Y-positions of the maximum values from the DRAM circuit 106. The processor 102 may track the X,Y motion of the objects/features corresponding to the maximum values in the step 260. The tracking may be based on the X-positions and the Y-positions of the maximum values from image-to-image.

Figure 13:
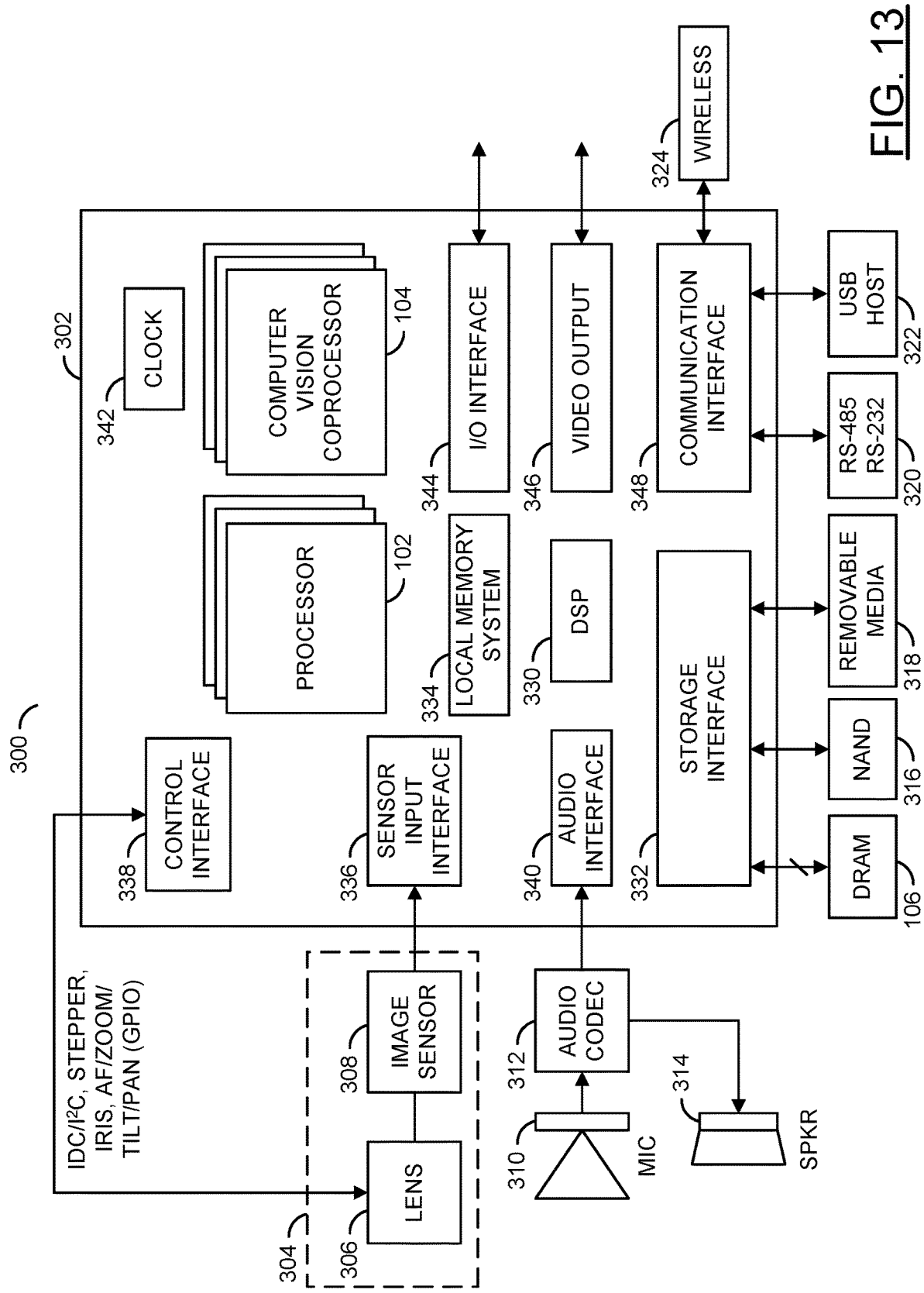
FIG. 13 is a diagram of a camera system.

Referring to FIG. 13, a diagram of a camera system 300 is shown illustrating an example implementation of a local maxima sub-integer position estimation system in accordance with an embodiment of the present invention. In one example, the electronics of the camera system 300 may be implemented as one or more integrated circuits. For example, an application specific integrated circuit (ASIC) or system on chip (SOC) may be used to implement the camera system 300.

In one example, the camera system 300 may comprise the DRAM circuit 106, a processor/camera chip (or circuit) 302, a block (or assembly) 304 having a block 306 and one or more blocks (or circuits) 308, a block (or circuit) 310, a block (or circuit) 312, a block (or circuit) 314, a block (or circuit) 316, a block (or circuit) 318, a block (or circuit) 320, a block (or circuit) 322 and a block (or circuit) 324. The circuits 106 and 304-324 may be connectable to the camera circuit 302.

In various embodiments, the camera circuit 302 may comprise one or more processors 102 (e.g., ARM, etc.), one or more coprocessors 104, a block (or circuit) 330, a block (or circuit) 332, a block (or circuit) 334, a block (or circuit) 336, a block (or circuit) 338, a block (or circuit) 340, a block (or circuit) 342, a block (or circuit) 344, a block (or circuit) 346 and a block (or circuit) 348. The circuits 102 through 348 may be connected to each other using one or more buses, traces, protocols, etc.

The circuit 304 may implement a lens and sensor assembly. The lens and sensor assembly 304 is shown connected to the camera circuit 302. In some embodiments, the lens and sensor assembly 304 may be a component of the camera circuit 302 (e.g., a SoC component). In some embodiments, the lens and sensor assembly 304 may be a separate component from the camera circuit 302 (e.g., the lens and sensor assembly may be an interchangeable component compatible with the camera circuit 302). In some embodiments, the lens and sensor assembly 304 may be part of a separate camera connected to the processing portion of the circuit 302 (e.g., via a video cable, a high definition media interface (HDMI) cable, a universal serial bus (USB) cable, an Ethernet cable, or wireless link). The lens and sensor assembly 304 may comprise other components (not shown). The number, type and/or function of the components of the lens and sensor assembly 304 may be varied according to the design criteria of a particular application.

The block 306 may implement a lens 306. The lens 306 may capture and/or focus light input received from the environment near the camera 300. The lens 306 may capture and/or focus light for the circuit 308. The lens 306 may be implemented as an optical lens. The lens 306 may provide a zooming feature and/or a focusing feature. The lens and sensor assembly 304 may be implemented with additional circuitry (e.g., motors) to adjust a direction, zoom and/or aperture of the lens 306. The lens 306 may be directed, tilted, panned, zoomed and/or rotated to provide a targeted view of the environment near the camera 300.

The circuit 308 may implement an image sensor. The image sensor 308 may receive light from the lens 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens 306. The image sensor 308 may present the converted image data as a color filter array (CFA) formatted bitstream. The camera circuit 302 may transform the bitstream into video data, video files and/or video frames (e.g., human-legible content).

The circuit 310 may be a microphone for capturing audio. The circuit 312 may be an audio codec for recording audio in a particular format. The circuit 314 may be a speaker for playing audio.

The circuit 316 may implement a nonvolatile memory (e.g., NAND flash memory, NOR flash memory, etc.). The circuit 318 may implement a removable media 318 (e.g., secure digital media (SD), secure digital extended capacity media (SDXC), etc.). The circuit 320 may implement one or more serial communication channels 320 (e.g., RS-485, RS-232, etc.). The circuit 322 may implement one or more universal serial bus (USB) hosts 322 and/or USB interfaces. The circuit 324 may implement wireless interface for communicating with a user device (e.g., a smart phone, a computer, a tablet computing device, cloud resources, etc.). In various embodiments, the wireless interface 324 and/or the USB Host 322 may be configured for communicating with a camera controller wirelessly. In the embodiment shown, the circuits 304-324 are implemented as components external to the camera circuit 302. In some embodiments, the circuits 304-324 may be components on-board the camera circuit 302.

The circuit 330 may be a digital signal processing (DSP) module. In some embodiments, the circuit 330 may implement separate image DSP and video DSP modules. The DSP module 330 may be configured to process digital signals. The DSP module 330 may comprise an image digital signal processor (IDSP), a video digital signal processor DSP (VDSP) and/or an audio digital signal processor (ADSP). The DSP module 330 may be configured to receive information (e.g., pixel data values captured by the image sensor 308) from the circuit 336. The DSP module 330 may be configured to determine the pixel values (e.g., RGB, YUV, luminance, chrominance, etc.) from the information received from the sensor input 336. The DSP module 330 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The circuit 332 may be a storage interface. The storage interface 332 may be configured to manage one or more types of storage and/or data access. In one example, the storage interface 332 may implement a direct memory access (DMA) engine and/or a graphics direct memory access (GDMA). In another example, the storage interface 332 may implement a secure digital (SD) card interface (e.g., to connect to the removable media 318).

The circuit 334 may implement a local memory system (e.g., cache, fast random access memory, etc.). In various embodiments, programming code (e.g., executable instructions for controlling various processors and encoders of the camera circuit 302) may be stored in one or more of the memories (e.g., the DRAM circuit 106, the NAND 316, etc.). When executed by the processors 102, the programming code generally causes one or more components in the camera circuit 302 to configure video synchronization operations and start video frame processing operations. The resulting compressed video signal may be presented to the storage interface 332, the video output 346 and/or the communication module 348. The storage interface 332 may transfer program code and/or data between external media (e.g., the DRAM circuit 106, the NAND 316, the removable media 318, etc.) and the local (internal) memory system 334.

The circuit 336 may implement a sensor input (or interface). The sensor input 336 may be configured to send/receive data to/from the image sensor 308. In one example, the sensor input 336 may comprise an image sensor input interface. The sensor input 336 may be configured to transmit captured images (e.g., light data) from the image sensor 308 to the DSP module 330 and/or the processors 102. The data received by the sensor input 336 may be used by the DSP 330 to determine a luminance (Y) and chrominance (U and V) values from the image sensor 308. The sensor input 336 may provide an interface to the lens and sensor assembly 304. The sensor input 336 may enable the camera circuit 302 to capture image data from the lens and sensor assembly 304.

The circuit 338 may implement one or more control interfaces including but not limited to an inter device communication (IDC) interface, an inter integrated circuit ($I^2C$) interface, a serial peripheral interface (SPI), and a pulse width modulation (PWM) interface. The control interface 338 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens and sensor assembly 304. The control interface 338 may enable the camera circuit 302 to control the lens and sensor assembly 304.

The circuit 340 may implement an audio interface (e.g., an $I^2S$ interface, etc.). The audio interface 340 may be configured to send/receive audio data. In one example, the audio interface 340 may implement an audio inter-IC sound ($I^2S$) interface. The audio interface 340 may be configured to send/receive data in a format implemented by the audio codec 312. The circuit 342 may implement a clock circuit including but not limited to a real time clock (RTC), a watchdog timer (WDT), and/or one or more programmable timers.

The circuit 344 may implement an input/output (I/O) interface. The I/O interface 344 may be configured to send/receive data. The data sent/received by the I/O interface 344 may be miscellaneous information and/or control data. In one example, the I/O interface 344 may implement a general purpose input/output (GPIO) interface. In another example, the I/O interface 344 may implement an analog-to-digital converter (ADC) module and/or digital-to-analog converter (DAC) module. In yet another example, the I/O interface 344 may implement an infrared (IR) remote interface. In still another example, the I/O interface 344 may implement one or more synchronous data communications interfaces (IDC SPI/SSI).

The circuit 346 may be a video output module. The video output module 346 may be configured to send video data. For example, the camera 300 may be connected to an external device (e.g., a TV, a monitor, a laptop computer, a tablet computing device, etc.). The video output module 346 may implement a high-definition multimedia interface (HDMI), an LCD/TV/Parallel interface and/or a DisplayPort interface. The video data may be presented in one or more formats (e.g., PAL, NTSC, VGA, WVGA, QVGA, SD, HD, Ultra HD, 4K, etc.).

The circuit 348 may be a communication module. The communication module 348 may be configured to send/receive data. The data sent/received by the communication module 348 may be formatted according to a particular protocol (e.g., Bluetooth, USB, Wi-Fi, UART, etc.). In one example, the communication module 348 may implement a secure digital input output (SDIO) interface. The communication module 348 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX and/or SMS. The communication module 348 may also include support for communicating using one or more of the universal serial bus protocols (e.g., USB 1.0, 2.0, 3.0, etc.). The camera circuit 302 may also be configured to be powered via a USB connection. However, other communication and/or power interfaces may be implemented accordingly to meet the design criteria of a particular application.

Embodiments of the invention generally provide a hardware-efficient architecture for estimating sub-pixel detection position based on a second-order polynomial interpolation. The architecture may take advantage of the unique characteristics of parabolas and the quantized nature of the specified results in order to reduce the computational effort. Instead on using complicated division/multiplication mechanisms and performing post-processing quantization, the invention provides a computational approach that use only simple hardware blocks (e.g., comparison operations, absolute value operations, shift operations, addition operations and subtraction operations). In addition, the approach only checks a small span of optimum candidate positions that depends on the number of fraction bits of the result. The invention may be immediately generalized for k bits fraction (e.g., k=2).

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines, virtual machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a first circuit configured to (i) receive a plurality of sample values from a plurality of images in a video signal and (ii) estimate a plurality of positions of a plurality of maximum values in said images, wherein each estimation operates on said sample values in a respective local region oriented parallel to an axis and said first circuit is further configured to generate a first intermediate value as a first difference between a first sample value of said sample values and a second sample value of said sample values, and a second intermediate value as a second difference between said second sample value and a third sample value of said sample values; and
a second circuit configured to track said positions of said maximum values in said images.

2. The apparatus according to claim 1, wherein (i) said sample values have an integer resolution spacing and (ii) said positions of said maximum values have a sub-integer resolution.

3. The apparatus according to claim 2, wherein said positions of said maximum values have a quarter-integer resolution.

4. The apparatus according to claim 1, wherein (i) said second circuit is further configured to send a command to said first circuit to determine said positions of said maximum values and (ii) said first circuit is further configured to return said positions of said maximum values to said second circuit.

5. The apparatus according to claim 1, wherein (i) said first circuit is configured to further estimate a plurality of additional positions of a plurality of additional maximum values in said images and (ii) each further estimation operates on said sample values in another local region oriented parallel to another axis.

6. The apparatus according to claim 5, wherein said second circuit is further configured to track said additional positions of said additional maximum values in said video signal.

7. The apparatus according to claim 1, wherein (i) said first circuit uses at most $2^K+1$ of said sample values in each of said images to estimate said positions of said maximum values and (ii) K is a positive integer value that determines a resolution of said positions of said maximum values.

8. The apparatus according to claim 1, wherein said first circuit is further configured to (i) generate a sum of said first intermediate value and said second intermediate value and (ii) generate a third difference between said first intermediate value and said second intermediate value.

9. The apparatus according to claim 8, wherein said first circuit is further configured to determine each of said positions of said maximum values from at most five possible positions based on said sum and said third difference.

10. The apparatus according to claim 8, wherein said first circuit is further configured to (i) determine if said first difference is greater than said second difference and (ii) determine each of said positions of said maximum values from at most three possible positions based on said sum and said third difference.

11. The apparatus according to claim 1, wherein (i) said first circuit uses at most $2^{(K-1)}+1$ of said sample values in each of said images to estimate said positions of said maximum values and (ii) K is a positive integer value that determines a resolution of said positions of said maximum values.

12. The apparatus according to claim 1, wherein said first circuit is further configured to perform a non-maximum suppression operation on said sample values to locate said respective local regions in said images.

13. The apparatus according to claim 1, wherein said first circuit is further configured to (i) perform a non-minimum suppression operation on said sample values to locate said respective local regions in said images and (ii) invert said sample values prior to estimating said positions of said maximum values.

14. The apparatus according to claim 1, wherein said apparatus forms part of a video processing system.

15. A method for local maxima position estimation, comprising the steps of:
receiving a plurality of sample values in each of a plurality of images in a video signal;
estimating in a circuit a plurality of positions of a plurality of maximum values in said images, wherein each estimation operates on said sample values in a respective local region oriented parallel to an axis and said circuit is configured to generate a first intermediate value as a first difference between a first sample value of said sample values and a second sample value of said sample values, and a second intermediate value as a second difference between said second sample value and a third sample value of said sample values; and tracking said positions of said maximum values in said video signal.

16. The method according to claim 15, further comprising the step of:

performing either (i) a non-maximum suppression operation on said sample values or (ii) a non-minimum suppression operation on said sample values to locate said respective local regions in said images.

17. The method according to claim 15, wherein (i) said circuit uses at most $2^K+1$ of said sample values in each of said images to estimate said positions of said maximum values and (ii) K is a positive integer value that determines a resolution of said positions of said maximum values.

18. The method according to claim 15, wherein (i) said circuit uses at most $2^{(K-1)}+1$ of said sample values in each of said images to estimate said positions of said maximum values and (ii) K is a positive integer value that determines a resolution of said positions of said maximum values.

19. The method according to claim 15, wherein (i) said sample values have an integer resolution spacing and (ii) said positions of said maximum values have a sub-integer resolution.

20. An apparatus comprising:

a first circuit configured to (i) receive a plurality of sample values from a plurality of images in a video signal and (ii) estimate a plurality of positions of a plurality of maximum values in said images, wherein each estimation operates on said sample values in a respective local region oriented parallel to an axis and said first circuit is further configured to perform a non-minimum suppression operation on said sample values to locate said respective local regions in said images and invert said sample values prior to estimating said positions of said maximum values; and a second circuit configured to track said positions of said maximum values in said images.

\* \* \* \* \*